Oct. 16, 1934.  S. B. HASELTINE  1,976,937
RAILWAY CAR TRUCK
Filed July 15, 1932
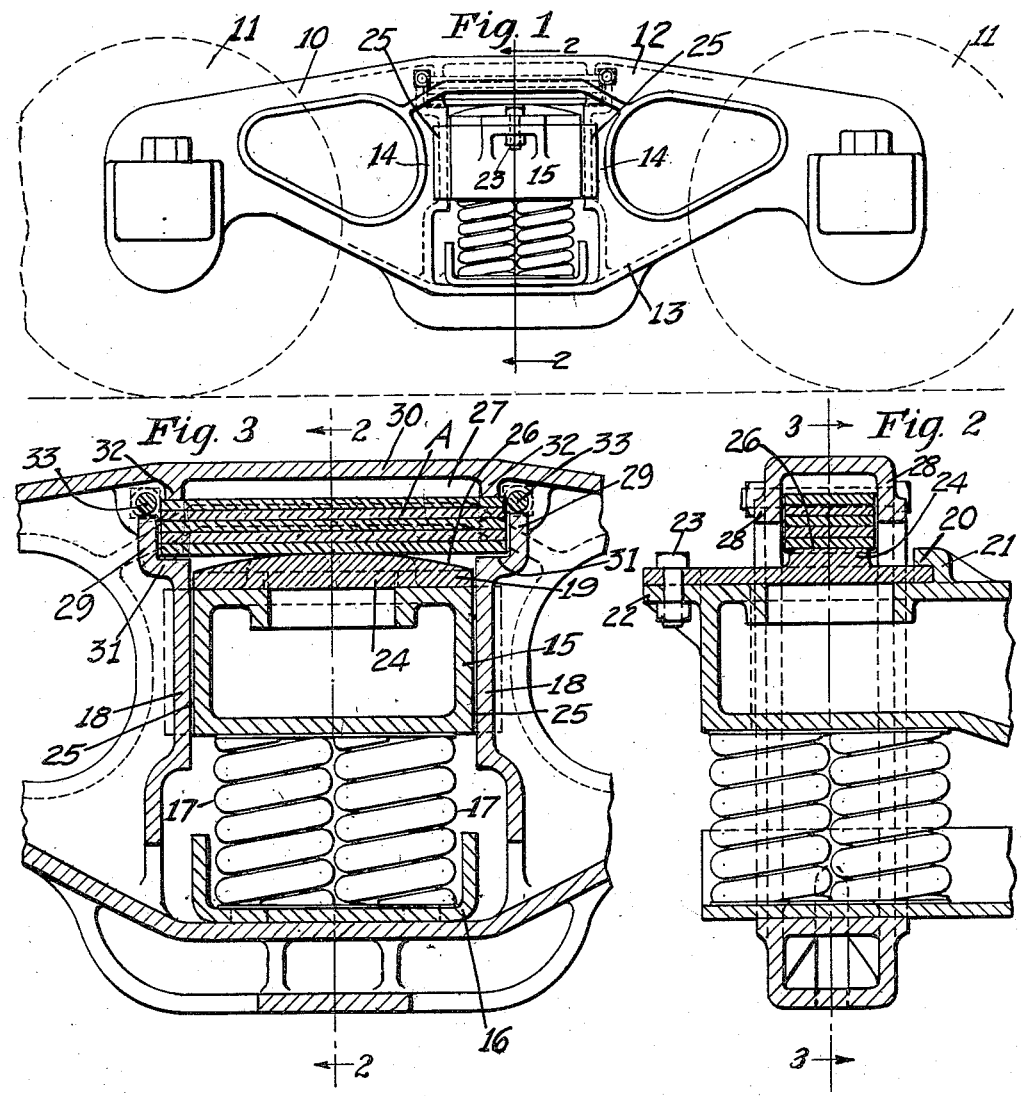
Inventor
Stacy B. Haseltine
By Henry Fuchs Atty.

Patented Oct. 16, 1934

1,976,937

UNITED STATES PATENT OFFICE 1,976,937

RAILWAY CAR TRUCK

Stacy B. Haseltine, Chicago, Ill., assignor to W. H. Miner, Inc., Chicago, Ill., a corporation of Delaware Application July 15, 1932, Serial No. 622,576

2 Claims. (Cl. 105—197)

This invention relates to improvements in railway car trucks.

One object of the invention is to provide a supplemental means in connection with the bolster of a railway car truck for snubbing or dampening the action of the usual truck springs, thereby reducing the oscillations and vibrations of the springs to such an extent that the lading of the car will not be damaged.

A more specific object of the invention is to provide a shock absorbing dampening means for cushioning the recoil of the springs of railway car trucks so as to minimize the vibrations imparted to the car body.

Other objects of the invention will more clearly appear from the description and claims hereinafter following.

In the drawing, forming a part of this specification, Figure 1 is a side elevational view of a railway car truck, illustrating my improvements in connection therewith, the wheels of the truck being indicated in dotted lines. Figure 2 is an enlarged vertical sectional view, partly broken away, corresponding substantially to the line 2—2 of Figure 1, said section being also indicated by the line 2—2 in Figure 3. And Figure 3 is a vertical sectional view, partly broken away, corresponding substantially to the line 3—3 of Figure 2.

In said drawing, 10 indicates one of the side frame members of a railway car truck, and 11—11 the car wheels. The side frame 10, as shown, is in the form of a casting and has top and bottom members 12 and 13 connected by spaced vertical sections 14—14 forming guides for the truck bolster. As will be understood by those skilled in this art, the truck includes two side frame members 10—10, a truck bolster 15, a spring plank 16, and truck springs 17—17. The opposite ends of the spring plank are supported on the bottom members 13—13 of the truck side frames 10—10, and the opposite ends of the bolster 15 are guided between the sections 14—14 and 14—14 of the truck side frames. As shown most clearly in Figures 1 and 3, the sections 14—14 are inwardly offset near the upper ends to provide guides 18—18, which cooperate with the guide seats 25—25 at the sides of the bolster 15.

In carrying out my invention, I provide a dampening means A, in the form of plate springs, which opposes upward movement of the bolster 15 and cushions the recoiling action of the truck springs 17—17, the bolster being provided with means which effects flexing of the spring plates when the bolster is projected upwardly.

The springs 17—17 at each side of the truck rest upon the spring plank 16 and support the corresponding end of the bolster 15, thus, yieldingly supporting the latter, which in turn supports the car body by means of the usual body bolster. The truck bolster 15 carries an abutment block or plate 19 at each end, which cooperates with the corresponding plate spring A. Each plate 19 is fixed to the top of the bolster and has the inner edge thereof engaged beneath a flange 20 formed on an upstanding section 21 at the corresponding end of the bolster. The outer end of the plate 19 is secured to an outstanding horizontal flange 22 at the top of the bolster 15 by means of a bolt 23. Between the side walls of the side frame, the plate 19 is provided with an upstanding enlargement 24 presenting a rounded upper surface 26, which engages the lowermost plate of the corresponding plate spring A.

Each plate spring as shown comprises a plurality of plates, preferably five in number, which are housed within a pocket 27 at the top of the truck frame. The pocket 27 is arranged above the truck bolster 15 and the guides 18—18. The pocket 27 is defined by spaced side walls 28—28, spaced end walls 29—29, and a top wall 30. The end walls 29—29 of the pocket are outwardly offset, as clearly shown in Figure 2, thereby providing horizontal ledges 31—31 on which the corresponding set of plate springs rests when the bolster 15 is depressed below the level of the ledges. The end walls 29—29 terminate short of the top wall 30 for a purpose hereinafter pointed out. At opposite ends of the pocket, the top wall 30 is provided with ribs 32—32 extending in the same direction as the end walls 29—29 but inwardly offset with respect to these walls so as to engage the uppermost spring plate of the set A adjacent to the opposite ends of said plate. The lower edges of the ribs 32—32 are spaced above the upper ends of the end walls 29—29 a distance greater than the thickness of one of the spring plates of the set A so that the spring plates may be inserted between the upper ends of the walls 29—29 and the lower edges of the ribs 32—32 in succession to assemble the set of plates A within the pocket 27. As will be evident, the ribs 32—32 form supporting means for the opposite ends of the group of spring plates A so that this group may be flexed between its ends when the bolster 15 is displaced upwardly. In order to prevent accidental removal of the plates of the set A, two retainer bolts 33—33 are employed, which extend through the side frame 10 immediately adjacent to the ribs 32—32 and the walls 29—29, thereby blocking the openings through which the plates are inserted in assembling the spring A.

The parts are so proportioned that when the springs A are assembled with the truck side frames, as shown in the drawing, the springs 17—17, which support the body bolster, are placed under an initial compression which is at least as great as the compression to which these springs are subjected by the dead weight of the railway car.

In the operation of my improved spring dampening means, the vibrations of the truck springs 17—17 will be dampened by the action of the two sets of spring plates A arresting the recoiling action of the springs 17—17 before the reactive effort of these springs has been exhausted. As will be evident, by this means the vibrations of the truck springs are reduced in number so that the railway car and its lading are protected from repeated damaging shocks.

When the body bolster is moved upwardly on recoil of the springs 17—17, the curved projecting abutment surface 26 will force the springs to be bowed upwardly between the ribs 32—32 of the pocket 27 of the corresponding side frame, the rounded upper surface of the plate 19 substantially conforming to the curvature of the spring plates when bowed to their limit. The reactive effort of the two sets of plate springs A will assist in returning the bolster 15 to the normal position shown in the drawing.

I have herein shown and described what I now consider the preferred manner of carrying out my invention, but the same is merely illustrative and I contemplate all changes and modifications that come within the scope of the claims appended hereto.

I claim:

1. In a railway car truck, the combination with a pair of side frame members, each having a vertical guideway; of a bolster having its opposite ends extending into said guideways, said bolster having rounded top abutment faces at opposite ends thereof; springs beneath said bolster yieldingly supporting the same on the side frames; a pocket in each side frame above the bolster; and a set of spring plates in each bolster pocket bearing on the rounded abutment face at the corresponding end of the bolster.

2. In a railway car truck, the combination with a pair of side frame members, each having a vertical guideway; of a bolster having its opposite ends projecting into said guideways, said bolster having rounded top faces at opposite ends thereof; coil springs supporting said bolster on said side frame members; a pocket in each side frame member above the bolster; and a set of substantially flat plate springs in each pocket held against bodily movement therein and adapted to be flexed, said plate springs bearing on the rounded abutment face at the corresponding end of the bolster.

STACY B. HASELTINE.